UNITED STATES PATENT OFFICE.

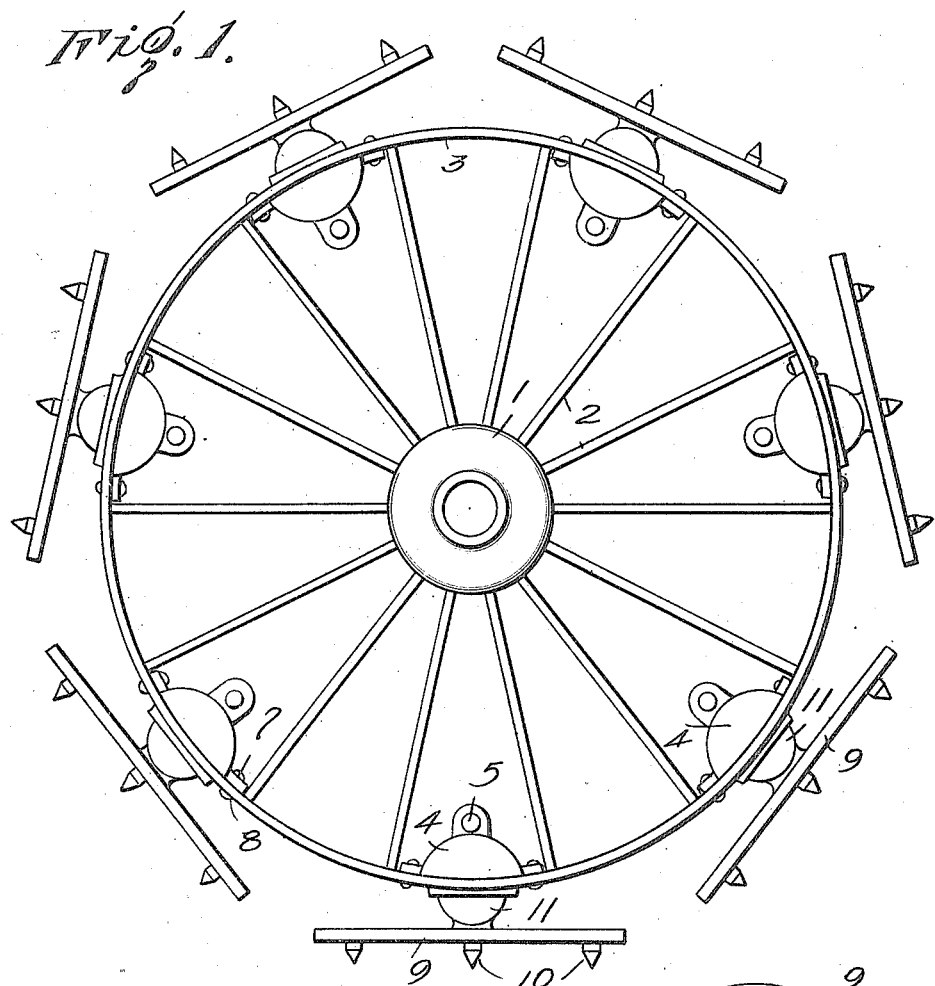
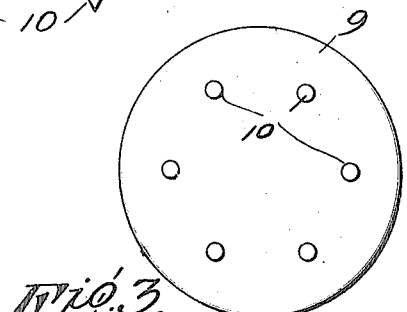
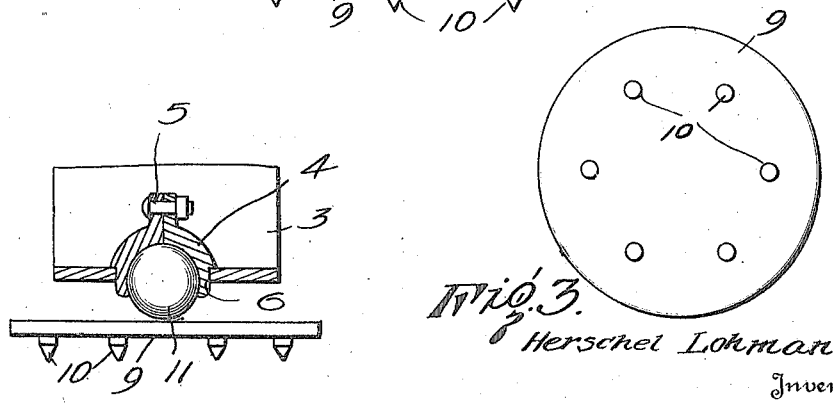

HERSCHEL LOHMAN, OF GREENVILLE, OHIO.

STEERING-WHEEL.

1,264,312.     Specification of Letters Patent.     Patented Apr. 30, 1918.

Application filed March 12, 1917. Serial No. 154,307.

*To all whom it may concern:*

Be it known that I, HERSCHEL LOHMAN, a citizen of the United States, and resident of Greenville, in the county of Darke and State of Ohio, have invented certain new and useful Improvements in Steering-Wheels, of which the following is a specification.

This invention relates to improvements in wheels and has for its dominant object to provide a novel steering wheel particularly adapted for use on one wheel drive tractors and other like vehicles, whereby, the course of travel of the wheel may be changed by the tractor operator with but little effort and without the transmission of strain to the running and steering gears of the tractors.

It is also an object of the invention to provide a wheel having a tread portion so formed as to prevent the sinking of the same into the earth during travel and to positively engage the earth, thus, insuring full driving power of the same.

All of the foregoing together with additional advantageous details and arrangements of parts of the preferred embodiment of my invention will be clear from the specific description hereinafter contained, when read in connection with the accompanying drawings forming a part hereof, wherein said embodiment of the invention is illustrated for the purpose of facilitating a full understanding of the present improvements.

In the drawings:

Figure 1 is a side elevation of my improved wheel;

Fig. 2 is a fragmentary transverse section therethrough; and

Fig. 3 is a bottom plan of one of the tread plates.

Similar characters of reference are employed in all of the above described views to indicate corresponding parts.

Referring now more specifically to the several figures of the said drawings, there is provided the usual vehicle wheel construction, including a hub 1, radiating spokes 2 and a rim 3. Openings are formed within the rim 3 equi-distant thereabout and receive therein sectional ball sockets 4, the said sections being secured together through the medium of bolts 5 which are passed through apertured lugs formed upon portions of the sections of the said socket. It is to be noted, that those portions of the socket 4 as adjacent the mouth of the same are reduced as at 6 whereby the same may be passed through the openings formed in the rim 3, while the shoulders as formed adjacent the inner extremities of the said reduced portions permit their respective sockets to be rigidly positioned upon the rim. Apertured lugs 7 are formed upon the opposite sides of the sockets 4 and are disposed longitudinally to the rim 3, whereby rivets or other suitable fastening devices 8 may be passed through the same into engagement with the said rim. Circular tread plates 9 having a plurality of calks 10 arranged in the bearing face thereof are provided and carry thereon balls 11 adapted for snug reception in the various sockets 4.

From the foregoing, it will be understood, that when any one of the tread plates 9 are engaged with the surface of a roadway or other course, the wheels may be readily steered in the desired direction with but little effort upon the part of the tractor operator and without the transmission of strain to the running gear or steering apparatus of the tractor. Further, by reason of the universal mounting of the tread plates 9, the wheels will readily travel over rough or uneven surfaces, since, the said tread plates will be permitted to adjust themselves to the bearing surface.

It is to be understood, that my improved wheel is particularly adapted for use in connection with one wheel drive tractors, the wheel serving as the driving element therefor as well as the means for steering the tractor in the desired direction. However, it is to be also understood that the improved wheel is not to be limited to use upon any one particular type of tractor or like vehicle but may be used in conjunction with various types of vehicles, such as conditions or preference may dictate.

Manifestly, the construction shown is capable of considerable modification and such modification as is within the scope of my claim, I consider within the spirit of my invention.

I claim:

In a wheel, a rim having a plurality of openings formed therein, sectional sockets having portions of the same reduced to provide shoulders to conform to the curvature of said rim and bearing thereon, means for securing the sockets to the rim, and tread plates carrying balls thereon received in said sockets.

In testimony whereof, I affix my signature.

HERSCHEL LOHMAN.